(12) United States Patent
Haas et al.

(10) Patent No.: US 9,108,473 B2
(45) Date of Patent: Aug. 18, 2015

(54) METHOD FOR THE OPERATION OF WHEEL ELECTRONICS, WHEEL ELECTRONICS, AND TIRE CHECKING SYSTEM

(75) Inventors: Thomas Haas, Donaustauf (DE); Gregor Kuchler, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 644 days.

(21) Appl. No.: 12/675,910

(22) PCT Filed: Aug. 21, 2008

(86) PCT No.: PCT/EP2008/060917
§ 371 (c)(1),
(2), (4) Date: Mar. 1, 2010

(87) PCT Pub. No.: WO2009/027298
PCT Pub. Date: Mar. 5, 2009

(65) Prior Publication Data
US 2010/0308987 A1    Dec. 9, 2010

(30) Foreign Application Priority Data
Aug. 27, 2007 (DE) .......................... 10 2007 040 340

(51) Int. Cl.
*B60C 23/00* (2006.01)
*B60C 23/04* (2006.01)

(52) U.S. Cl.
CPC ........... *B60C 23/041* (2013.01); *B60C 23/0462* (2013.01)

(58) Field of Classification Search
CPC ............ B60C 23/0408; B60C 23/0413; B60C 23/041; B60C 23/0411; B60C 23/0433

USPC ................. 340/447, 445, 10.33, 10.34, 539.3
See application file for complete search history.

(56) References Cited

U.S. PATENT DOCUMENTS

| 6,894,600 | B2 * | 5/2005 | Phelan .................... 340/10.34 |
| 7,286,859 | B2 * | 10/2007 | Cunningham et al. ......... 455/574 |
| 7,532,957 | B2 | 5/2009 | Kuchler |
| 8,106,768 | B2 * | 1/2012 | Neumann ................ 340/539.26 |
| 2005/0242939 | A1 * | 11/2005 | Hagl et al. .................... 340/447 |
| 2005/0280523 | A1 | 12/2005 | Watabe |

(Continued)

FOREIGN PATENT DOCUMENTS

| DE | 10250906 A1 | 5/2004 |
| DE | 102004026035 A1 | 12/2005 |

(Continued)

*Primary Examiner* — Eric M Blount
(74) *Attorney, Agent, or Firm* — Laurence A. Greenberg; Werner H. Stemer; Ralph E. Locher

(57) ABSTRACT

A method for operating wheel electronics of a tire checking system includes providing wheel electronics having a battery-free power supply encompassing at least one rechargeable power storage medium for supplying power to the wheel electronics. The wheel electronics can be operated in a reduced-power transmission mode and a subsequent normal transmission mode. In the modes, data that relate to tire-specific parameters and are determined by the wheel electronics are transmitted to a vehicle-mounted communication device in the form of modulated transmission signals, with less transmission power being used for the transmission signals in the power-reduced transmission mode than in the normal transmission mode. Wheel electronics and a tire checking system are also provided.

24 Claims, 7 Drawing Sheets

(56) References Cited

U.S. PATENT DOCUMENTS

2006/0028333 A1* 2/2006 Tyndall .................. 340/447
2006/0071768 A1* 4/2006 Iwazumi et al. ............ 340/447
2007/0069879 A1   3/2007 Kuchler

FOREIGN PATENT DOCUMENTS

| EP | 1623849 A2 | 2/2006 |
| JP | 9237398 A | 9/1997 |
| WO | 2005115771 A1 | 12/2005 |

* cited by examiner

PRIOR ART

METHOD FOR THE OPERATION OF WHEEL ELECTRONICS, WHEEL ELECTRONICS, AND TIRE CHECKING SYSTEM

BACKGROUND OF THE INVENTION

Field of the Invention

The invention relates to a method for operating wheel electronics in or for a tire checking system of a vehicle, wheel electronics and a tire checking system.

This present invention relates to a safety system for monitoring and determining tire-specific parameters such as tire pressure. Such systems are generally known as tire information systems or tire checking systems. The invention and the problem on which it is based are explained in the following by reference to a tire pressure system, but without the invention being limited to said system.

Because vehicle safety and reliability are central factors in automotive engineering, the tire pressure of motor vehicles must be regularly checked on safety grounds alone, in order to detect defective wheels in good time. This check is frequently neglected.

Furthermore, a tire pressure checking system is also appropriate for economic reasons because a tire pressure which is too low results in a roll resistance of the tire which is too high, which leads directly to a higher fuel consumption.

For this reason, modern motor vehicles usually have tire pressure checking systems which automatically measure the tire pressure and are designed to provide early detection of a critical deviation of the measured tire pressure from a desired tire pressure. This renders a manual check unnecessary.

A tire pressure checking system of this kind typically has at least one wheel electronics system containing a wheel sensor which is designed to record a tire-specific parameter of a wheel assigned to this wheel sensor and to transmit information derived from the measured value to a vehicle-mounted receiving device by means of a transmitting device of the wheel electronics.

Because of the wireless communication between the wheel electronics and the vehicle, a local power supply is necessary for the wheel electronics. In many tire pressure checking systems the wheel electronics is fitted with a battery. Such battery-aided wheel electronics systems have the advantage that the power supply for measuring both the tire-specific parameters and for subsequently transmitting this information to a vehicle-mounted receiving device is provided by the battery. However, a battery fitted inside a wheel tire always generates an additional imbalance which has to be expensively compensated for. Furthermore, wheel tires, especially for fitting to trucks are in service for a very long time and a battery must therefore have a correspondingly long service life. Furthermore, a battery must be capable of reliable use in a wide temperature range. These and other requirements are presently leading to relatively expensive batteries.

Particularly for this reason, different battery-free systems have been developed for the supply of power to a wheel electronics system. Generally, battery-free systems have the advantage of an all but unlimited service life compared with battery-aided systems and are maintenance-free due to the system. They are therefore chosen as the starting point for an inventive development.

In this case, there are several possibilities for implementing a battery-free power supply for wheel electronics, of which one is based on the principle of energy transport and another on the principle of energy conversion. Both approaches have a rechargeable power storage medium. They differ mainly due to the type of recharging of the power storage medium:

a) With the power transport approach, power is taken from the environment of the wheel electronics, e.g. from electromagnetic waves by means of inductive antennas and stored in the power storage medium. The energy obtained in this way can be stored in a capacitor of the wheel electronics or used to charge an accumulator. The advantage of this is that the power supply of the wheel electronics can be charged even with a vehicle stationery. An example of wheel electronics operating on this principle is the "Tire IQ" system, developed by Siemens VDO.

b) With the energy conversion approach, mechanical energy from the wheel is converted into electrical power, e.g. by means of a piezo-ceramic or capacitive energy convertor and is stored in the power storage medium. The advantage of this is that there is no requirement for additional expenditure with respect to the vehicle power supply and there is always sufficient power available during vehicle operation, and there is therefore sufficient power for transmission in order to transmit the tire-specific information to the vehicle-mounted central receiver.

FIG. 1 shows a signal-time diagram for a charging operation of a battery-free, rechargeable power storage medium in wheel electronics. The power storage medium, which typically is discharged, has to be recharged after the start of operation before the wheel electronics can again transmit data to the vehicle-mounted receiving device. The technical problem with both the aforementioned approaches, and particularly with recharging using energy conversion, is in the startup time. The startup time $T_{ANL}$ is the charging time period of the power storage medium from the time when the vehicle is brought into service after a lengthy vehicle shutdown until a working voltage $U_{ARB}$, adequate for the transmission of a transmission signal to the vehicle-mounted receiving device is achieved. It appears that the charging time $T_{ANL}$ up to reaching the working voltage $U_{ARB}$ is relatively long. However, transmission is still not possible within this period. A significant time period, amounting sometimes to several minutes, can elapse before the wheel electronics can begin to send transmission signals to the vehicle-mounted receiving device. This is a state which should be avoided, particularly for safety reasons.

BRIEF SUMMARY OF THE INVENTION

Against this background, the object of this invention is to provide an improved, and especially safer, method for a tire checking system for the transmission of transmission signals by the tire electronics.

This object is achieved by a method for operating a wheel electronics system of a tire checking system, with the wheel electronics system comprising a battery-free power supply encompassing at least one rechargeable power storage medium for supplying power to the wheel electronics system, whereby the wheel electronics system can be operated in a power-reduced transmission mode and in a subsequent normal transmission mode, through which data that relates to tire-specific parameters are determined by the wheel electronics system and are transmitted to a vehicle-mounted communication device in the form of modulated transmission signals, with less transmission power being used for the transmission signals in the power-reduced transmission mode than in the normal transmission mode, and/or by a wheel electronics system for a tire checking system of a vehicle, especially for performing the method according to the invention, with a battery-free power supply, which has at least one rechargeable power storage medium for the power supply to the wheel electronics system and a charging device for charging the rechargeable power storage medium, with a transmitting device for transmitting transmission signals, which contains information on tire-specific parameters, with the transmitting device being constructed to transmit the transmission signals in a power-reduced transmission mode and in a subsequent normal transmission mode, and/or by a tire checking system in or for a vehicle, with a vehicle-mounted base station which has a central control and evaluation device, with at least one vehicle-mounted transmitting/receiving device which is connected to the base station, and with at least one wheel electronics system according to the invention, which is constructed to wirelessly communicate with a vehicle-mounted transmitting/receiving device assigned to it.

The invention is based on a battery-free tire checking system which has a rechargeable power storage medium such as a capacitor or an accumulator. The idea on which this invention is based is to minimize the starting time of a power self-sufficient wheel electronics system immediately after the vehicle is brought into service after a lengthy vehicle shutdown time, but at the same time to maintain the robustness of the transmission mode.

The idea is to design the transmission mode of the wheel electronics so that the wheel electronics sends transmission signals with information and tire-specific parameters via the wheel electronics to a vehicle-mounted receiving device in at least two stages. In a first stage, which follows immediately on the starting mode, a power-reduced transmission mode, in which the transmission power necessary for transmission is at least reduced compared with the transmission power required for a normal transmission mode, takes place. This normal transmission mode then follows the power-reduced transmission mode.

What is meant by a power-reduced transmission mode is a transmission mode in which, immediately after an initial or renewed start of operation of the wheel electronics (after an interruption), a number of transmission telegrams are sent to the vehicle-mounted communication device for communication between the wheel electronics and a vehicle-mounted communication device, with a first transmission power being provided in each case for these transmission telegrams, and with the normal transmission mode being a transmission mode during which further transmission telegrams, each with a second transmission power which is greater than the first transmission power, are sent for the further communication. According to the invention, the starting time, which precedes the power-reduced transmission mode, is significantly reduced by this two-stage transmission mode. The starting time in this case is the time duration from a starting point from which the deactivated wheel electronics, in which the energy power storage medium is discharged, is brought back into operation and thus supplied with power, and a working time point elapses after which the power storage medium of the wheel electronics is supplied with sufficient energy in order to establish a communicative connection with a vehicle-mounted communication device.

By means of this two-stage transmission mode, it is possible to establish a communicative connection with the vehicle-mounted communication device very early and to thus transmit to this vehicle-mounted communication device at least such data as is required there as initial data and/or most urgent data. Less relevant or less important information can then be transmitted at a later time point, for example during the normal transmission mode. This improves the overall security due to the possibility of a very early data communication between the tire electronics and the vehicle-mounted receiving device, which enables a vehicle-mounted evaluation device to receive very early information regarding some tire-specific parameters and/or information regarding the tire electronics.

In a similar manner, the robustness of the communication method and the method of functioning of the wheel electronics are not impaired because the power-reduced transmission mode also guarantees data communication which is very high and which in particular has the same robustness as the normal transmission mode, which requires comparatively more power.

Advantageous embodiments and developments of the invention result from the further subclaims and from the description in conjunction with the drawing.

In a preferred embodiment, the transmission signals are transmitted in the form of predetermined transmission telegrams. Within a transmission telegram of this kind the information is present in the form of a predetermined data structure, i.e. for each transmission telegram a data frame is provided which is divided into different data sections, with these data sections containing specific information. In the power-reduced transmission mode, transmission telegrams are transmitted with a data content which is reduced compared with the normal transmission mode. This can, e.g. mean that one or more of the sections of the data frame which are transmitted in normal transmission mode are omitted in the power-reduced transmission mode. Typically, the length, and therefore the duration, of the transmission telegrams with a data reduced content is smaller than the transmission telegrams with a normal content. In a typical embodiment, the number of transmission telegrams with a data-reduced content which are sent is between 1 and 50. The energy reduced transmission mode is typically limited to 3 to 10 transmission telegrams.

In a preferred embodiment, the transmission telegrams contain basic information in the power-reduced transmission mode. This basic information can, for example, be necessary for the identification of the wheel electronics by a vehicle-mounted detection device. Other basic information, such as a checksum, can also be provided either additionally or as an alternative.

In an equally advantageous embodiment, the transmission telegrams in normal transmission mode can have further information, such as diagnostic information, temperature information and/or tire pressure information, in addition to the basic information sent in the power-reduced transmission mode. Additionally or alternatively, information can also be contained in this regarding the construction and structure of the transmission telegram, a checksum, an EOT section or similar. Generally in this case information is transmitted regarding the function of the tire electronics and/or tire-specific parameters.

In a preferred embodiment, in the power-reduced transmission mode the information of the data-reduced transmission telegrams, e.g. the diagnostic, temperature and/or tire pressure information not sent compared with the normal transmission mode, is sent with the normal transmission mode immediately following the power-reduced mode. It would, of course, be conceivable for this information not to be sent at all, e.g. sent topically on demand in each case.

In a preferred embodiment, a first power storage medium is provided for the power-reduced transmission mode. For the normal transmission mode, at least one further power storage medium is additionally provided. As an addition or alternative, at least one larger power storage medium can be used instead of the first power storage medium.

In a preferred embodiment, at least one capacitive power storage medium is provided, whose power storage capacity is variably adjustable for the power-reduced and normal transmission modes. A controllable capacitor whose storage capacity can be varied is, for example, provided for this purpose.

In a particularly preferred embodiment, a more power efficient modulation method is provided for the power-reduced transmission mode than for the normal transmission mode. For example, for the power-reduced transmission mode an ASK (Amplitude Modulated Transmission) signal is generated and transmitted, whereas in the normal transmission mode an FSK, (Frequency Modulated Transmission) signal is generated and transmitted. Less power is necessary for the generation and transmission of amplitude-modulated transmission signals than for frequency-modulated transmission signals. Additionally or alternatively, an increase in the data transmission rate can also be provided for the power-reduced transmission mode, thus requiring a lower power for the transmission of the transmission signals. For example, in the power-reduced transmission mode a higher data transmission rate of, e.g. 100 kBits/sec is used compared with the normal transmission mode with a significantly lower data transmission rate of e.g. 9.6 kBits/sec.

The power-reduced transmission mode directly follows the startup time of the power storage medium. Typically, but not necessarily, the power-reduced transmission mode is followed directly by the normal transmission mode.

An inventive tire electronics system has at least one wheel sensor to determine the tire-specific parameters, such as tire pressure, tire temperature, the speed of rotation, the profile depth etc.

A battery-free power supply is a local power supply for the wheel electronics which is achieved without a battery. In a preferred embodiment of the inventive wheel electronics, the rechargeable power storage medium of the power supply is designed as an accumulator or alternatively as a capacitive power storage medium, especially as a capacitor.

In a preferred embodiment, a control device is provided which controls the transmission mode and which determines when the wheel electronics can be operated in power-reduced transmission mode and when it can be operated in normal transmission mode. For this purpose, the control device is connected in each case with the transmitting device of the wheel electronics. Preferably the control device is designed to variably adjust the storage capacity of the capacitive power supply medium for the power-reduced transmission mode and the normal transmission mode, for example so that a lower capacity of the capacitive power storage medium is provided for the power-reduced transmission mode and this power storage capacity is increased for the normal transmission mode.

In a preferred embodiment, a modulation device, which can be controlled by means of the control device, is provided. Depending on the control by the control device, a more power-efficient modulation method, for example amplitude modulation instead of the frequency modulation otherwise used, is provided for the power-reduced transmission mode. Additionally or alternatively, a more power-efficient, higher data transmission rate can also be used here for the power-reduced transmission mode. Overall, the robustness of the data transmission is thus also maintained in the power-reduced transmission mode.

In a typical embodiment, the wheel electronics has a transponder which has a charging device designed as a receiving antenna. By means of this receiving antenna electromagnetic waves coupled in from the environment of the wheel electronics, which for example are transmitted from the vehicle, are received and the electrical energy contained therein is used to charge the rechargeable power storage medium.

Additionally or alternatively, the wheel electronics has a charging device designed as a mechanical energy converter. This mechanical energy convertor is designed to convert the energy of the wheel, for example its kinetic energy, into electrical energy and to use this electrical energy to charge the rechargeable power storage medium. Preferably, this mechanical energy convertor is designed as a capacitive, inductive and/or piezo-ceramic convertor.

In a typical embodiment, the tire checking system is designed as a tire pressure checking system for determining at least the tire pressure and/or tire temperature.

BRIEF DESCRIPTION OF THE SEVERAL VIEWS OF THE DRAWING

This present invention is described in more detail in the following with the aid of the examples given in the drawings. The drawings are as follows.

DESCRIPTION OF THE INVENTION

Figure 1:
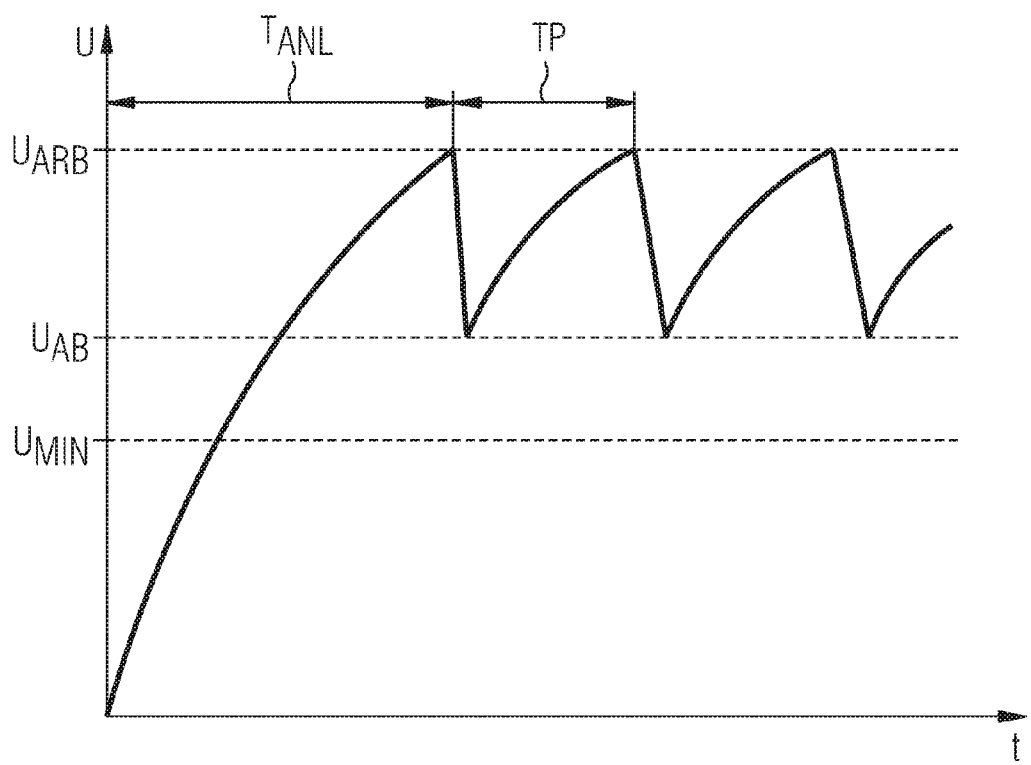
FIG. 1 A signal-time diagram for a conventional charging process of a power storage medium of a battery-free wheel electronics system.

In the illustrations of the drawing, elements, features and signals which are the same and have the same function are given the same reference character, unless otherwise stated.

Figure 2:
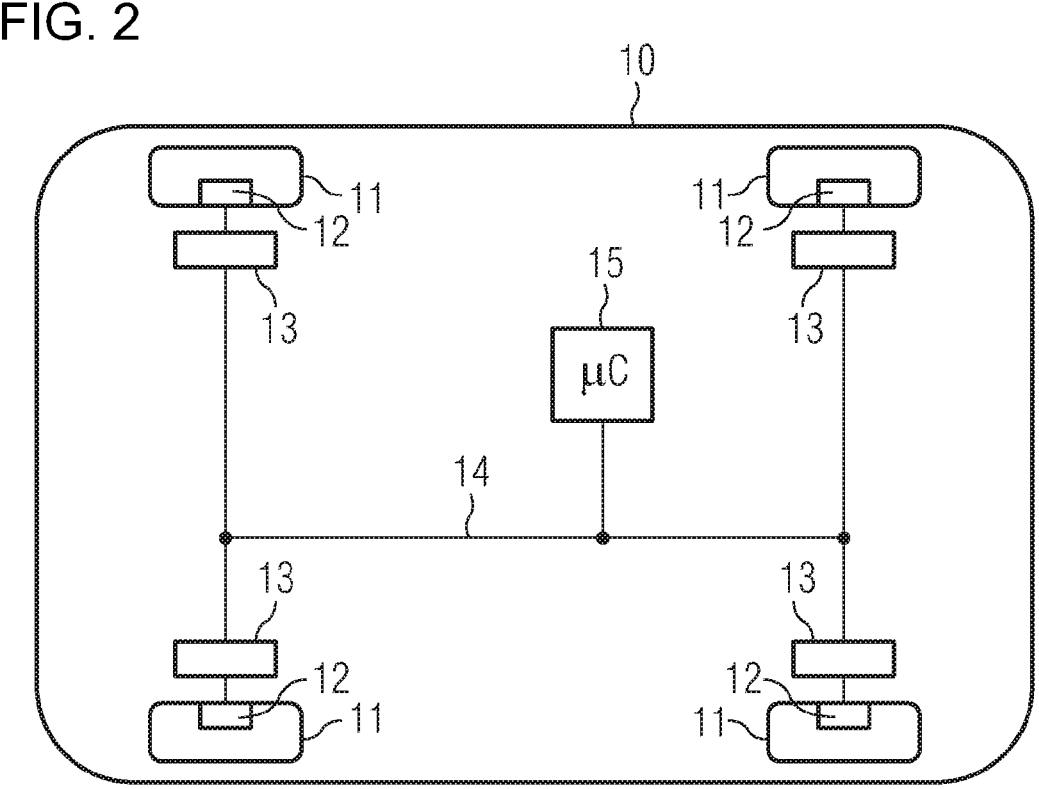
FIG. 2 A schematic plan view of a passenger car to explain the inventive tire checking system.

FIG. 2 is a schematic plan view of a vehicle 10, e.g. a passenger car. The vehicle 10 has an inventive tire pressure checking system, for example, for determining the tire pressure. This tire pressure checking system has electronic wheel devices on the wheel, referred to in the following as the wheel electronics systems 12, transmitting/receiving devices 13 mounted on the vehicle, a bus 14 and a central control unit 15. In this present exemplary embodiment, at least one wheel electronics system 12 is assigned to each wheel 11. This wheel electronics system 12 can, in a known manner, be, for example, inside a particular tire, i.e. vulcanized into its rubber material or fitted in the area of the valve, on the rim of the wheel 11 or on its tire.

Figure 3:
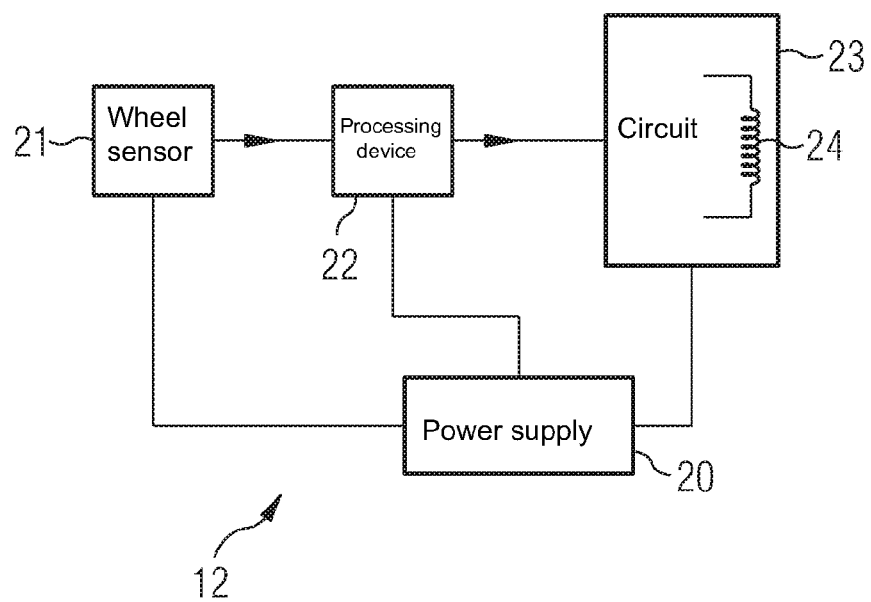
FIG. 3 A block diagram showing an example of the construction of a wheel electronics system.

FIG. 3 is a schematic block diagram showing an example of a construction of wheel electronics 12 of this kind. The wheel electronics 12 has a wheel sensor 21 designed as a pressure sensor 21, a processing device 22 connected to the pressure sensor 21 and a transmitting/receiving circuit 23 connected to the processing device 22, with the transmitting/receiving circuit 23 having a transmitting/receiving antenna 24 and being supplied with electrical power from a local power supply 20, for example from an accumulator or a capacitor. This wheel electronics system 12 is designed so that the current tire pressure of the respective wheel 11 can be measured by means of the pressure sensor 21. The wheel sensor 21 can also, additionally or alternatively, determine other parameters.

Figure 4:
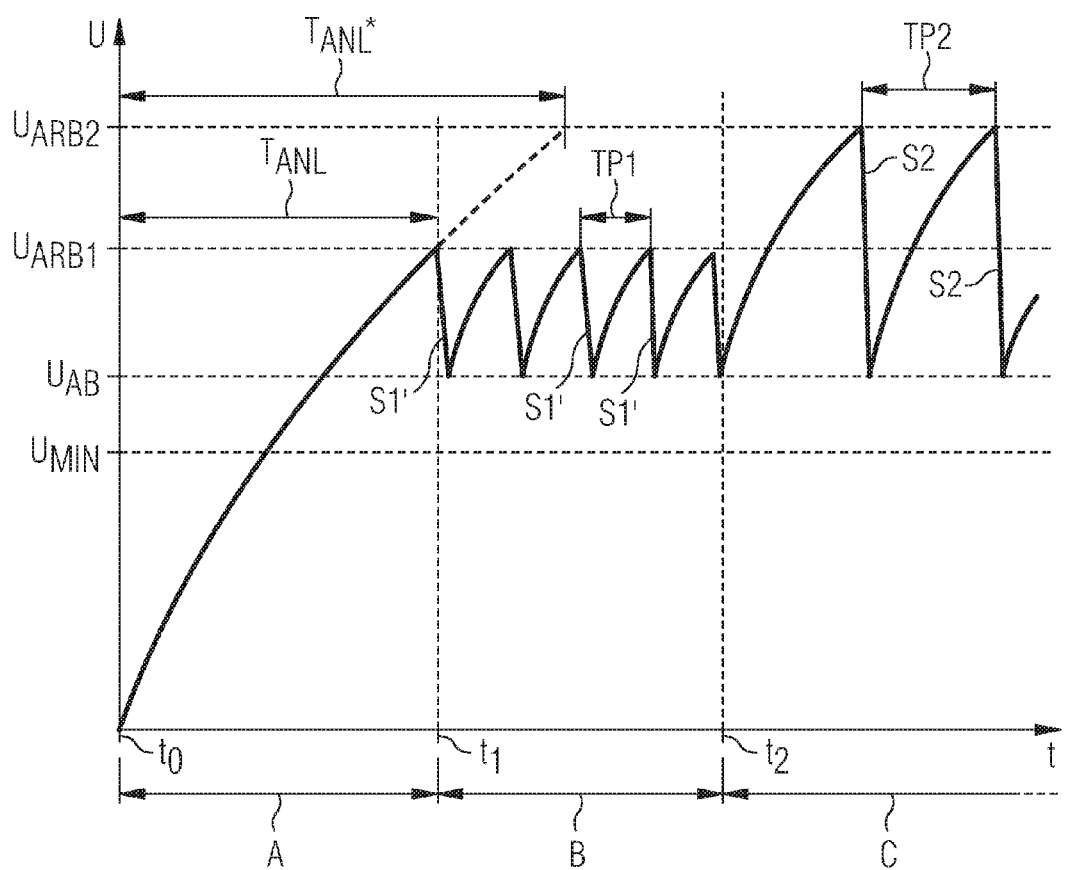
FIG. 4 A signal-time diagram of a first example of the charging process of a power storage medium of an inventive wheel electronics system, including the subsequent transmission mode.

FIG. 4 shows the signal-time diagram for a charging process of a rechargeable power storage medium for an inventive wheel electronics system. It may be assumed that the inventive tire checking system or its wheel electronics is first deactivated. In the deactivated state the power storage medium of the wheel electronics is at least partially discharged and in the present example is assumed to be completely discharged. The power storage medium thus initially, i.e. at time point to, has a voltage UO of approximately 0 volt.

The signal-time diagram in FIG. 4 has a total of three time sections A, B, C, which represent a startup mode A, a first, so-called power-reduced transmission mode B and a second normal transmission mode C. These time sections A-C are explained in the following:

Startup Mode A:

When the vehicle starts operating after a lengthy vehicle shutdown, the tire checking system is re-activated, which means that the power storage medium contained in the wheel electronics is recharged from time point t0. The energy for the charging can, for example, be achieved by means of energy transport. In addition or alternatively, the necessary energy for charging the power storage medium can be obtained by energy conversion.

The power storage medium is thereby charged, causing its voltage to rise. For a succeeding transmission operation, i.e. for time sections B and C, the working voltage provided by the power storage medium must be greater than a minimum voltage $U_{MIN}$ under which no data communication by the wheel electronics can be guaranteed. The power storage medium is charged until the working voltage $U_{ARB1}$ ($U_{ARB1} > U_{MIN}$) is reached. This occurs at time point t1. The time duration $T_{ANL}=t1-t0$ is the startup time and therefore the startup mode A necessary for charging the power storage medium to the working voltage $U_{ARB1}$.

Power-Reduced Transmission Mode B:

The power-reduced transmission mode B follows this, beginning at time point t1. In this case, first transmission telegrams S1 (see also FIG. 5) are transmitted as soon as a respective working voltage $U_{ARB1}$ is provided by the power storage medium. These transmission telegrams S1 are sent via the transmitting antenna in the form of transmission signals S1' to a vehicle-mounted communication device. To transmit transmission signals S1' with such transmission telegrams S1, transmission energy is required and this causes a drop in the voltage U of the power storage medium to voltage $U_{AB}$. At this voltage $U_{MIN}$, the transmission signal S1' is sent with the transmission telegram S1 and a new charging of the power storage medium to the working voltage $U_{ARB1}$ can take place. In the present exemplary embodiment a total of four transmission telegrams S1 are transmitted within the time duration t2-t1=4*TP1, with the time duration TP1 representing the duration necessary for charging the power storage medium from the dropped voltage $U_{AB}$ to the working voltage $U_{ARB1}$.

Normal Transmission Mode C:

Normal transmission mode takes place from time point t2. During the normal transmission mode the power storage medium is charged from the dropped voltage $U_{AB}$ to the second working voltage $U_{ARB2}$. The second working voltage $U_{ARB2}$ is at least greater, and particularly significantly greater, than the first working voltage $U_{ARB1}$. For the particular charging process to the second working voltage $U_{ARB2}$, a time duration TP2>TP1 is provided. In the normal transmission mode, transmission signals S2' are transmitted with transmission telegrams S2. For these transmission signals S2' a greater energy is, however, required and this requires a higher working voltage $U_{ARB2}$ for transmitting the transmission signals S2' compared with the first working voltage $U_{ARB1}$.

Figure 6:
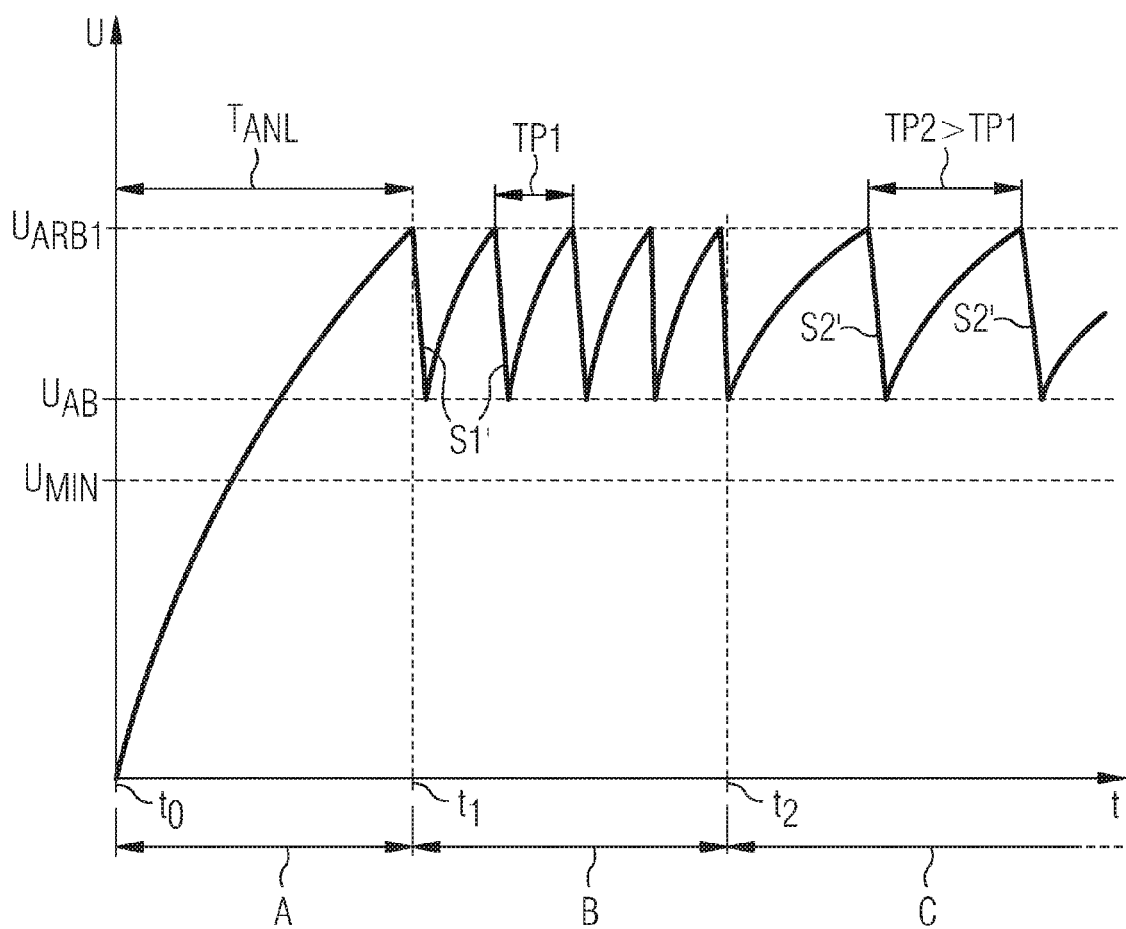
FIG. 6 A signal-time diagram of a second example of the charging process of a power storage medium of an inventive wheel electronics system, including the subsequent transmission mode.

FIG. 6 shows a comparison of the charging process for charging a power storage medium which would be necessary for the normal mode C (see dotted line) to the voltage $U_{ARB}$. It is clear that the startup time $T_{ANL}$ which is necessary for this second larger power storage medium is significantly greater than the startup time $T_{ANL}$ for the small, first power storage medium. Because of this it is possible to start the power reduced-transmission mode B very early.

Due to the fact that a lower working voltage $U_{ARB1}$ is used in the power-reduced transmission mode B, a reduction in the startup time $T_{ANL}$ is obtained compared with the case where the power storage medium has to be immediately charged to the higher working voltage $U_{ARB2}$ (dotted line).

Figure 5:
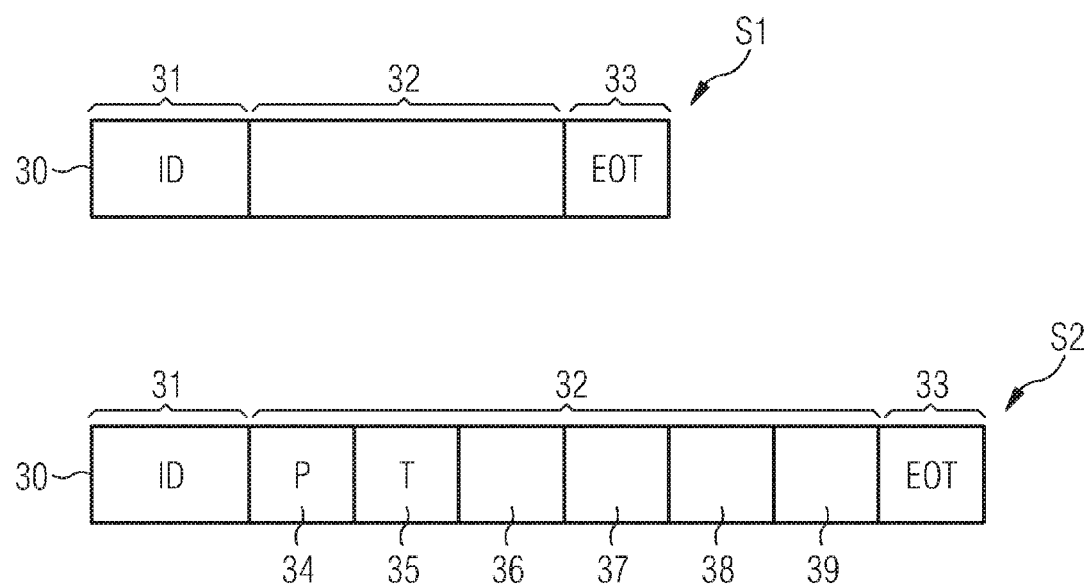
FIG. 5 The data structure of a transmission telegram sent in the normal transmission mode and a data-reduced transmission telegram used in the power-reduced transmission mode.

FIG. 5 shows the data structure for the power-reduced transmission telegram S1 and the normal transmission telegram S2. The data structure of both transmission telegrams S1, S2 is indicated in each case by the reference character 30. A transmission telegram 30 has a header section 31, a data section 32 and an end section 33. The header section 31, for example, contains information regarding the wheel electronics, i.e. identification and information. Data section 32, for example, contains the data to be transmitted. It is assumed that data section 32 contains information regarding the tire pressure 34, the tire temperature 35, the profile depth 36, the speed of rotation of the wheel 37, parity bits 38, a checksum 39, etc. An EOT (end of transmission) symbol, which indicates the end of the transmission telegram 30, is, for example, contained in the end section 33.

The data content of the first transmission telegrams S1 is significantly smaller that the data content of the second transmission telegrams S2. For example, transmission telegram S1 may be provided only with the header section 31 and end section 31, whereas data section 32 is empty or contains at least only the data content absolutely necessary for a transmission mode. On the contrary, transmission telegram S2 has, e.g. a complete data content. Therefore, transmission telegram S1 has a data-reduced content, for whose transmission a lower energy expenditure is also necessary, compared with transmission telegram S2. Only data-reduced telegrams S1 are sent during the power-reduced transmission mode B immediately following the startup mode A, because in this case it is, e.g. assumed that only relevant information, such as identification of the respective wheel electronics system, is required initially by the vehicle-mounted communication device. The remaining information can be sent at a later time point, for example in the normal transmission mode C.

FIG. 6 shows a further signal/time diagram for illustrating a charging process of a power storage medium. In this case also three time sections A-C are provided. In contrast to the exemplary embodiment in FIG. 4, the rechargeable power storage medium in the exemplary embodiment in FIG. 6 is, of course, always charged to the same working voltage $U_{ARB}$. Whereas in the exemplary embodiment in FIG. 4 the same rechargeable power storage medium is in each case charged to different working voltages $U_{ARB1}$, $U_{ARB2}$ in both time sections B, C, in the example in FIG. 6 different power storage media are provided for the provision of the transmission power in both times sections B, C. In this present case, it is assumed that for the power-reduced transmission mode B a first power storage medium is used which has a lower power storage capacity than the second power storage medium used in the normal transmission mode. This means that during the startup mode A the first power storage medium with the lower storage capacity is first charged to the working voltage $U_{ARB}$. Because a smaller charge is required for charging this comparatively small power storage medium, this power storage medium is very quickly charged, thus significantly minimizing the startup time $T_{ANL}$.

After four data-reduced transmission telegrams S1 have been transmitted in this power-reduced, and therefore more energy-efficient, transmission mode B, a switchover takes place at time point t2 to the power storage medium which is larger with respect to the power storage capacity or a further power storage medium is switched in parallel with the first power storage medium. The charging process and therefore the charging time TP2 for charging this larger power storage medium is therefore longer (TP2>TP1). Transmission telegrams S2 with the complete data content can, of course, now be transmitted. The transmission telegrams S1, S2 can also in this case have the structure shown in FIG. 5.

Additionally or alternatively, it would be also conceivable for the transmission signals S1', S2', which contain these transmission telegrams S1, S2, to be modulated using different modulation methods and/or have a different data transmission rate. For example, the transmission signal S1' with the transmission telegram S1 can have a higher data transmission rate and/or a more energy-efficient modulation method (such as ASK (amplitude modulation)) compared to the transmission signals S2' with the transmission telegrams S2, which, for example, have a lower data transmission rate and/or a more precise but more energy-consuming modulation method, such as FSK (frequency modulation).

This switchover from the power-reduced transmission mode B to the normal transmission mode C can, e.g. then take place, if in addition to the lower power storage medium the existing power storage medium with a greater storage capacity that can thus provide a greater working voltage, is charged. In this case, a switchover to the normal transmission mode can take place after the working voltage provided by the larger power storage medium has been reached. This can, for example, take place by monitoring the charged state of this larger power storage medium, which typically takes place by means of a program-controlled device. In this way, an automatic switchover from the power-reduced mode to the normal transmission mode B, C is also possible.

Figure 7:
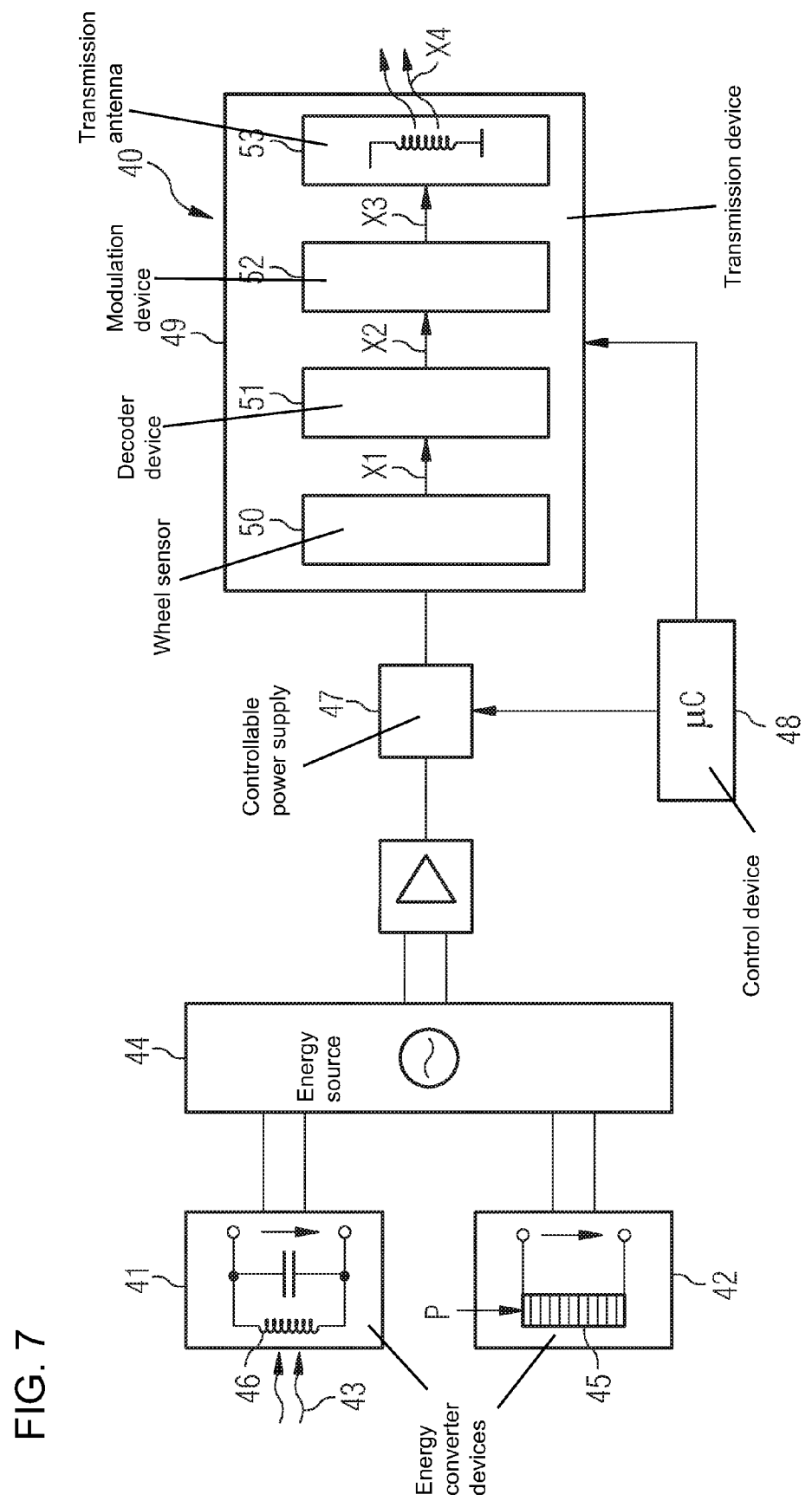
FIG. 7 A block diagram showing an inventive wheel electronics system.

FIG. 7 shows a block diagram for an inventive wheel electronics system for performing a startup operation, described with the aid of FIGS. 4 and 6, and a subsequent two-stage transmission mode. The wheel electronics shown here, by the reference character 40, includes two energy converter devices 41, 42. The energy converter device 41 works according to the principle of energy transport described in the introduction, whereby high-frequency electromagnetic waves 43 are received by an inductive receiving antenna 46 and the electrical power thus received is provided to charge one of the energy sources 44 fitted downstream of the converter device 41. The second converter device 42 operates on the principle of energy conversion, by means of which mechanical energy is converted into electrical energy. For this purpose, the converter device 42 has a piezo-ceramic device 45 which converts a pressure P on the piezo crystal 45 to an electrical voltage. The electrical voltage generated in this way can be fed to the downstream energy source 44.

Even though two different converter devices 41, 42 are provided in FIG. 7, it is also possible to provide only one of these devices.

The energy source 44 is upstream of a controllable power supply 47. The controllable power supply 47 is controlled via a control device 48, for example, a program-controlled device. The control device 48 is designed to control both the controllable power supply and also the transmitting device 49. The outlet of the controllable power supply is connected to a device 49 which contains the actual components of the wheel electronics 40. This device 49 contains at least one wheel sensor 50, which determines the tire-specific parameters such as the tire pressure or tire temperature and, depending on this, outputs a measurement signal X1 which contains these tire-specific parameters. This measurement signal X1 is supplied to a downstream decoder device 51 which codes the determined tire-specific parameters and generates a coded transmission signal X2 which is modulated in the downstream modulation device 52 using a suitable method of modulation. The transmission signal X3 modulated in this way, which contains the data to be transmitted in coded form and in accordance with a predetermined transmission protocol, is then wirelessly transmitted to a vehicle-mounted communication device by means of a transmission antenna 53 as a transmission signal X4 which contains the transmission telegrams S1, S2. This transmitting device 49 is supplied for this purpose with power by the controllable power supply 47 and, in this case especially, with a supply voltage. The controllable power supply 47 precisely provides a particular working voltage required for supply of the transmitting device 49.

In the following, two exemplary embodiments for a possible realization of the controllable power supply 47 are explained with the aid of FIGS. 8 and 9.

Figure 8:
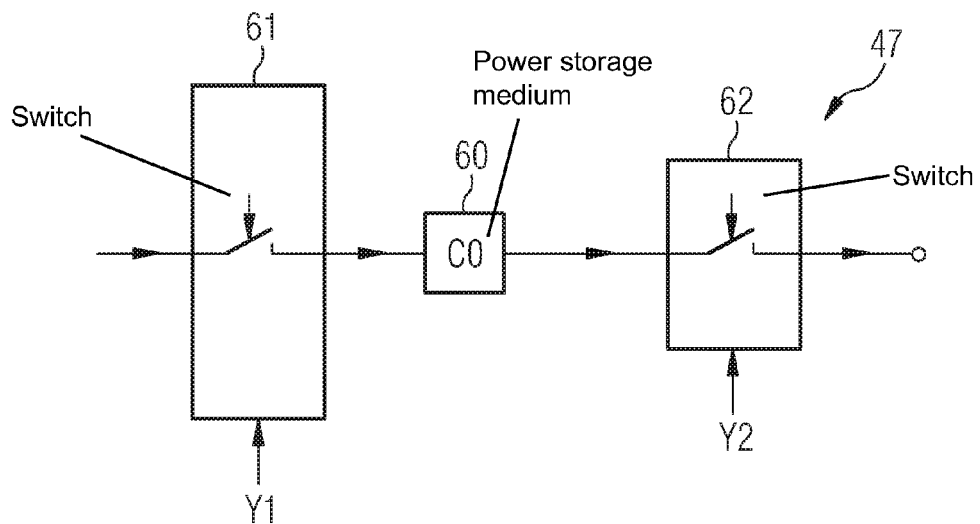
FIG. 8 A first exemplary embodiment of the controllable power supply from FIG. 7.

In the first exemplary embodiment according to FIG. 8, the controllable power supply has a single power storage medium 60. This power storage medium 60 can, e.g. be designed as a capacitor or as an accumulator. In the example shown, the power supply medium 60 is designed as a capacitor with a capacity C0. A controllable switch 61, 62 is provided at both the input and output ends of the capacitor 60. These two controllable switches 61, 62 can be switched on and off, e.g. by means of control signals Y1, Y2 from the control device 48. When the switch 61 is closed, the capacitor 60 is charged and when the switch 62 is closed the voltage provided by the capacitor 60 is made available to the transmitting device 49.

By means of the controllable switch 61, the capacitor 60 is charged only to the lower working voltage $U_{ARB1}$ in the power-reduced transmission mode and switch 61 is then reopened. For the normal transmission mode C, the capacitor 60 is charged to the higher working voltage $U_{ARB2}$ by means of the controllable switch 61 for example by controlling the charging time. In this way, the charging time can provide two different working voltages by means of one single capacitor 60 by appropriately controlling the charging time.

Figure 9:
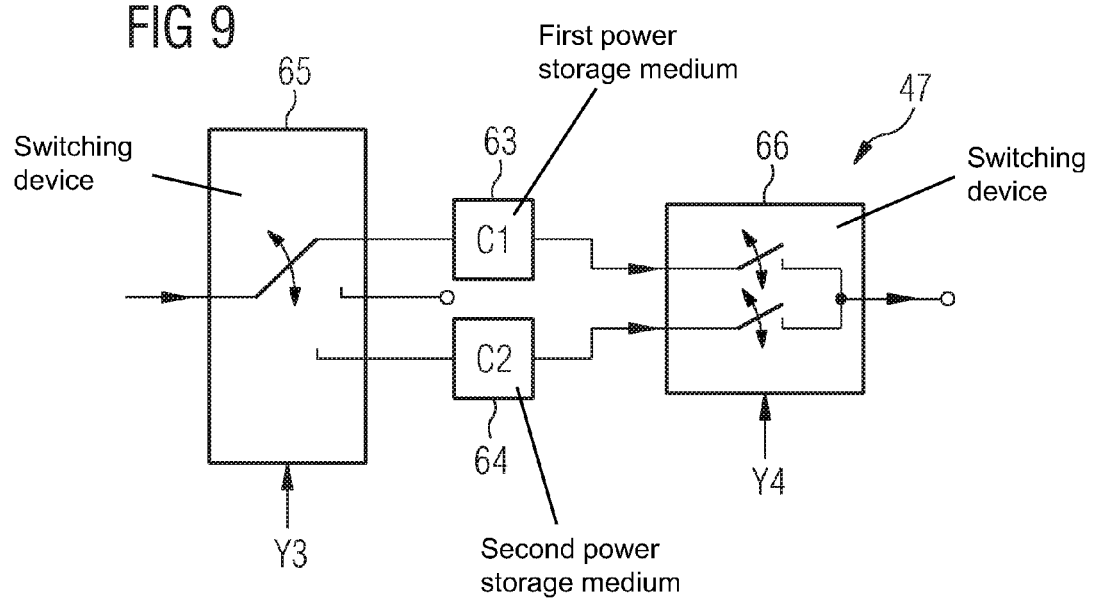
FIG. 9 A second exemplary embodiment of the controllable power supply from FIG. 7.

In the exemplary embodiment shown in FIG. 9, a first power storage medium 63 is provided with the capacity C1 and a second power storage medium 64 with the storage capacity C2. These power storage media 63, 64, which e.g. can be designed as capacitors, are arranged here parallel to each other. The input and output ends of these capacitors 63, 64 are each provided with controllable switching devices 65, 66. By means of the controllable switching device 65 at the input end, a control signal Y3 of the control device 48 can be controlled to charge either one of the two capacitors 63, 64 in turn or to charge both capacitors 63, 64. By means of the controllable switching device 66 at the output end, which is switched by means of control signals Y4 of the control device 48, either of the two capacitors 63, 64 or also both capacitors 63, 64 can be switched on and off as required. The switching on and off of the capacitors can also be automated, for example, in that their charge states are checked by the control device 48. In this connection, it can also be advantageously provided that an automatic switching takes place from the power-reduced transmission mode B to the normal transmission mode C as long as the capacitor(s) provided for the normal transmission mode C are respectively completely charged or at least sufficiently charged so that they provide the working voltage required for the normal transmission mode.

The realization of the circuit for the controllable power supply 47 in FIG. 9 is advantageously suitable for supporting both startup and transmission processes described in FIGS. 4 and 6. It is assumed for example that C1<C2 for the power supply media 63, 64. In the power-reduced state, it can e.g. be provided that only the capacitor 63 is switched on by means of the device 66 and the transmitting device 49 is thus supplied with a working voltage. In the normal transmission mode following the power-reduced transmission mode, it can now be additionally provided that the capacitor 64 can also be switched in via the switching device 66. In this case, the supply voltage is provided from both capacitors 63, 64. It would also be conceivable as an alternative for the capacitor 63 to be switched off in the normal transmission mode and for capacitor 64, which by comparison provides higher power storage capacity and thus a greater supply voltage, to be switched on and the transmitting device 49 to be supplied with a working voltage.

Although this present invention has been described using exemplary embodiments, it is not limited to these but instead can be modified in a variety of types and ways. In particular, the invention is not limited to the special numerical details given.

It is obvious that the controllable power supplies shown in FIGS. 8 and 9 merely represent exemplary embodiments which can be suitably varied and modified and also extended without requiring an inventive step on the part of the person skilled in the art.

Even though the invention in this case was described using wheel electronics with a wheel pressure sensor, the invention is not exclusively limited to the determination of the tire pressure. In fact any device which determines information from which possible fault states on the wheel can be detected, or other wheel properties, can be understood to be wheel electronics. The term "fault state" in this connection is to be regarded as wide and includes all states, properties and information of a particular wheel which is considered worthy of detection, for example also the tire temperature, the angular speed, the angular acceleration, the tire profile thickness etc. In this connection also information on the state and properties of the wheel electronics are naturally considered worthy of detection. In addition to the actual detection of such a fault state, the wheel electronics system is typically also designed to determine the wheel position of the individual wheels together with a particular fault state so that the vehicle user can assign the fault state to a specific wheel position. Normally an individual identifier characterizing the tire is transmitted together with the tire state data for this purpose. This determination of the wheel position is also known in the relevant literature as localization.

The invention claimed is:

1. A method for operating a wheel electronics system of a tire checking system for a vehicle, the wheel electronics system being located on a wheel of the vehicle, the method comprising the following steps:
   providing a controllable, battery-free power supply having at least one rechargeable power storage medium located on the wheel in the wheel electronics system for supplying power to the wheel electronics system,
   the wheel electronics system including a control device located on the wheel configured to operate the controllable, battery-free power supply of the wheel:
   1) in a startup mode, when the vehicle starts operating, for a first time period during which transmission does not occur and the rechargeable power storage medium is charged to a predefined power-reduced working voltage;
   2) in a first, power-reduced transmission mode immediately following the startup mode for a second time period; and
   3) in a subsequent normal transmission mode;
   determining data relating to tire-specific parameters with the wheel electronics system; and
   transmitting the data to a vehicle-mounted communication device as modulated transmission signals, with less transmission power being used for the transmission signals in the power-reduced transmission mode than in the normal transmission mode, the transmission signals in the first, power-reduced transmission mode being modulated according to a first modulation method and the transmission signals in the subsequent normal transmission mode being modulated according to a second modulation method different from the first modulation method.

2. The method according to claim 1, which further comprises transmitting the transmission signals as predetermined transmission telegrams with a predetermined data structure, and transmitting the transmission telegrams in the power-reduced transmission mode with a data content being reduced as compared with the normal transmission mode.

3. The method according to claim 2, which further comprises transmitting, in the power-reduced transmission mode, between 1 and 50 transmission telegrams with a data-reduced content.

4. The method according to claim 2, wherein the transmission telegrams in the power-reduced transmission mode contain basic information.

5. The method according to claim 4, wherein the basic information is at least one piece of identifier information necessary for identification of the wheel electronics system by a vehicle-mounted detection device.

6. The method according to claim 4, wherein the transmission telegrams in the normal transmission mode contain further information in addition to the basic information sent in the power-reduced transmission mode.

7. The method according to claim 6, wherein the further information is at least one of diagnostic, temperature or tire pressure information.

8. The method according to claim 6, wherein the further information not sent in the power-reduced mode, compared with the normal transmission mode, is sent in the normal transmission mode.

9. The method according to claim 1, wherein said at least one rechargeable power storage medium includes at least one of:

a first power storage medium for the power-reduced transmission mode and at least one further power storage medium for the normal transmission mode; or at least one power storage medium having a greater storage capacity than a first power storage medium used only for the power-reduced transmission mode.

10. The method according to claim 1, wherein said at least one rechargeable power storage medium includes at least one capacitive power storage medium having a power storage capacity being variably set for the power-reduced transmission mode and the normal transmission mode.

11. The method according to claim 1, which further comprises using, for the power-reduced transmission mode, a more energy-efficient modulation method than for the normal transmission mode.

12. The method according to claim 11, wherein the more energy-efficient modulation method is an ASK (Amplitude Modulation) method.

13. The method according to claim 1, wherein the normal transmission mode immediately follows the power-reduced transmission mode.

14. A wheel electronics system for a tire checking system of a vehicle, the wheel electronics system being located on a wheel of the vehicle, the wheel electronics system comprising:
 a controllable, battery-free power supply located on the wheel having at least one rechargeable power storage medium for power supply to the wheel electronics system and a charging device for charging said at least one rechargeable power storage medium; and
 a transmitting device connected to said power supply for transmitting transmission signals containing information on tire-specific parameters;
 a control device located on the wheel configured to operate said controllable, battery-less power supply of the wheel:
  1) in a startup mode, when the vehicle starts operating, for a first time period during which said transmitting device does not transmit transmission signals and the rechargeable power storage medium is charged to a predefined power-reduced working voltage;
  2) in a first, power-reduced transmission mode immediately following the startup mode for a second time period;
  3) in a subsequent normal transmission mode; and
 said transmission signals in the first, power-reduced transmission mode being modulated according to a first modulation method and said transmission signals in the subsequent normal transmission mode being modulated according to a second modulation method different from said first modulation method.

15. The wheel electronics system according to claim 14, wherein said at least one rechargeable power storage medium is an accumulator or a capacitive power storage medium or a capacitor.

16. The wheel electronics system according to claim 14, wherein said at least one rechargeable power storage medium includes at least a first rechargeable power storage medium for the power-reduced transmission mode and at least one further rechargeable power storage medium for the normal transmission mode.

17. The wheel electronics system according to claim 14, which further comprises a control device for controlling the transmission mode and specifying when the wheel electronics system is operated in the power-reduced transmission mode and when it is operated in the normal transmission mode.

18. The wheel electronics system according to claim 17, wherein said control device is configured for variably adjusting a power storage capacity of said power storage medium for the power-reduced transmission mode and the normal transmission mode.

19. The wheel electronics system according to claim 17, which further comprises a modulation device to be controlled by said control device for providing a more energy-efficient modulation method for the power-reduced transmission mode.

20. The wheel electronics system according to claim 14, which further comprises a transponder having a charging device configured as a receiving antenna receiving electrical energy for charging said at least one rechargeable power storage medium from electromagnetic waves received by said receiving antenna.

21. The wheel electronics system according to claim 14, which further comprises a charging device configured as a mechanical energy convertor converting mechanical energy of a wheel assigned to the wheel electronics system into electrical energy for charging said at least one rechargeable power storage medium.

22. The wheel electronics system according to claim 21, wherein said mechanical energy convertor is at least one of a capacitive, inductive or piezo-ceramic convertor.

23. A tire checking system in or for a vehicle, the system comprising:
 a vehicle-mounted base station having a central control and evaluation device;
 at least one vehicle-mounted transmitting/receiving device connected to said base station; and
 at least one wheel electronics system according to claim 14 for wirelessly communicating with one said vehicle-mounted transmitting/receiving device assigned to said at least one wheel electronics system.

24. The system according to claim 23, wherein the tire checking system is a tire pressure checking system for determining at least one of tire pressure or tire temperature.

* * * * *